April 28, 1925.
G. V. McCAULEY
BLOW IRON
Filed Feb. 28, 1923
1,535,168
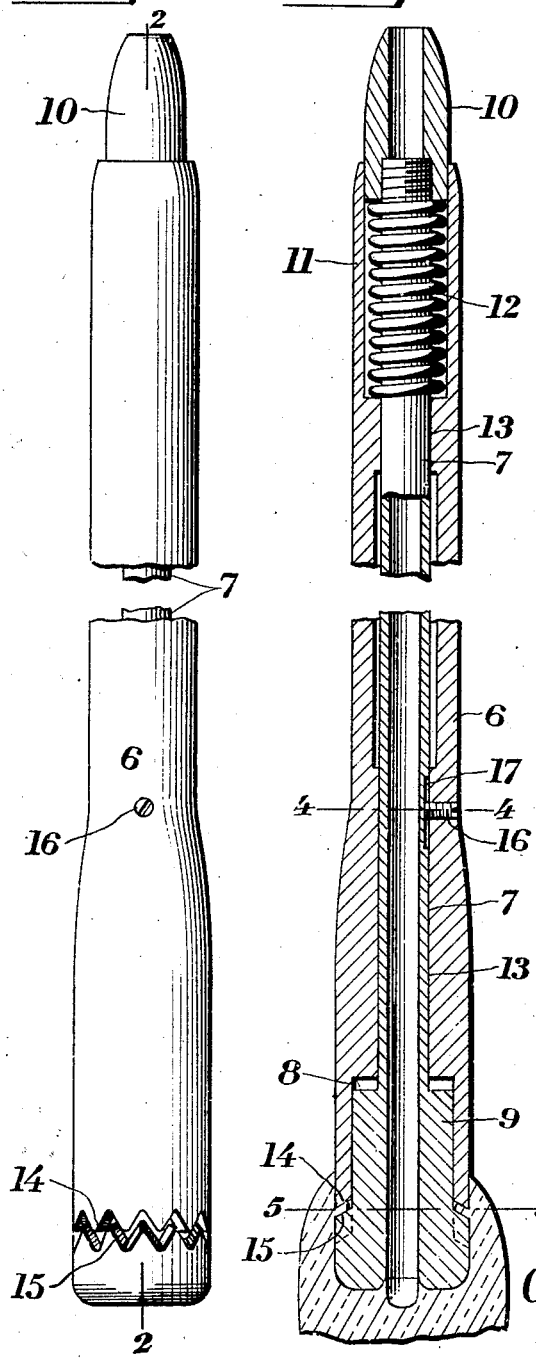
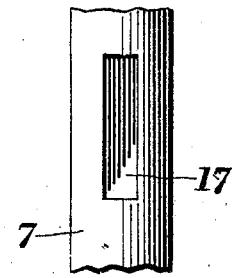
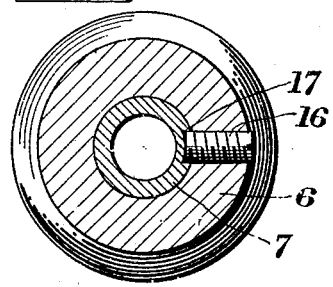
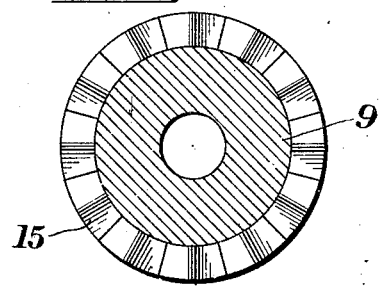
INVENTOR
George V. McCauley
BY
Dorsey & Cole
ATTORNEY Patented Apr. 28, 1925.

1,535,168

UNITED STATES PATENT OFFICE.

GEORGE V. McCAULEY, OF CORNING, NEW YORK, ASSIGNOR TO CORNING GLASS WORKS, OF CORNING, NEW YORK, A CORPORATION OF NEW YORK.

BLOW IRON.

Application filed February 28, 1923. Serial No. 621,894.

*To all whom it may concern:*

Be it known that I, GEORGE V. McCAULEY, a citizen of the United States of America, residing at Corning, in the county of Steuben and State of New York, have invented new and useful Improvements in Blow Irons, of which the following is a specification.

This invention relates to blow-irons such as are used for gathering glass. The prime object is to provide an improved blow-iron that can be used while it is cold, means being provided for gripping the glass so as to retain it on the end of the iron.

In the usual type of blow-iron for hand shops, semi-automatic and automatic machines for making glassware, glass must wet the iron before it can be gathered. This necessitates the iron be run at a red heat, and consequently iron scales off with the blow glass that is cracked off the iron. This adds iron to the subsequent melt when the cracked-off glass is used again as cullet. Furthermore, the scaling takes place to some extent in the bore of the iron in the neighborhood of the heated end. These scales find their way into the blown ware, and are the source of considerable scale loss.

In the accompanying drawings, wherein I have illustrated one embodiment of my invention:—

Figure 1, is an elevation of a blow-iron constructed according to my invention;

Fig. 2, is a vertical longitudinal section taken on the line 2—2 of Fig. 1;

Fig. 3, is a fragmentary elevation of one of the elements of the iron;

Fig. 4, is a horizontal section, taken on the line 4—4 of Fig. 2, and

Fig. 5, is a horizontal section, taken on the line 5—5 of Fig. 2.

Referring now to the drawings, the blow-iron comprises an outer tubular casing 6 which may be of any length desired, and a tube 7 that is slidably mounted within the casing. The lower end or that portion of the casing 6 which forms the gathering end of the iron is made slightly greater in diameter than the upper portion, as has been heretofore customary in devices of this character, and the interior of the extreme lower end of this portion of the casing is bored to provide an annular recess 8 that receives the enlarged end 9 formed on the lower extremity of the tube.

The tube 7, above the end 9 thereof, is of uniform diameter, and its upper end is threaded for the reception of a tubular blow-tip 10, which latter is slidably mounted in an enlarged recess 11, that is formed in the upper portion of the casing 6. The recess 11 is of considerable length so as to provide a chamber for an expansible spring 12, that surrounds the upper end of the tube 7.

While the tube 7, above its lower end 9, is made of uniform diameter, this construction is not true of the outer casing 6, for the hollow bore in this latter member is so made that only comparatively small bearing surfaces 13 of approximately the diameter of the tube 7, are formed near each of its ends, the balance of the bore being made of greater diameter than the tube, so as to prevent frictional engagement of the surfaces of the two tubular parts of the device.

The portion of the end 9 of the tube that abuts the lower end of the casing 6, and also the lower edge of the latter are serrated or formed with teeth, as shown in Figs. 1, 2, and 5, to provide jaws 15 and 14 respectively. These jaws are for the purpose of gripping the molten glass when the same is gathered on the end of the iron and thereby prevent the gather from slipping while the glass is being worked. The purpose of the spring 12 is to keep the jaws closed except when they are opened for gathering, at which time the serrations form a sinuous groove around the blow pipe.

Any rotation of the jaws with respect to each other is prevented by a pin 16 that projects into a slot 17 formed in the tube 7 as shown by Figs. 2, 3, and 4. If so desired the pin 16 may be in the form of a set-screw as shown. The slot 17 is only formed part way in the surface of the tube 7 so that the tube is maintained air tight for blowing.

In the use of the device, when a gather is being made the jaws 14 and 15 on the lower end of the iron are separated thereby depressing the tip 10. When the end of the iron has been immersed in the glass, the tip 10 is released and the jaws will be closed on a small layer of glass, through the action of the spring 12. This serves as a nucleus upon which other glass is gathered by rotating the iron in the usual manner. The viscosity of the glass is then relied on, as with the ordinary iron, to enable the operator to complete the gather by rapid rotation of the iron.

Having thus described my invention, what I claim is:—

1. A gathering blow-iron comprising a casing, a tube slidably mounted within the casing, said tube having an enlarged lower end abutting the end of the casing, and serrations formed on the abutting portions of the tube and casing.

2. A gathering blow-iron having an expansible gathering end formed with a sinuous groove for gripping molten glass.

3. A gathering blow-iron comprising a casing having its lower end serrated, a tube slidably mounted with the casing, the lower end of said tube having formed thereon serrations meshing with the serrations on the casing, and means for preventing the tube from turning within the casing.

4. A gathering blow-iron having means on its gathering end for pinching molten metal.

5. A gathering blow-iron having on its gathering end movable jaws tensioned towards each other.

6. A gathering blow-iron including a casing, a tube slidable therein, alined jaws on the casing and tube, and means tensioning the casing and tube relatively to each other and axially thereof.

7. A gathering blow-iron having tensioned means on its gathering end for compressing a portion of the material into which the blow-iron is dipped.

8. An implement for gathering molten glass, having a peripheral externally sinuous open groove and means for clamping molten glass in said groove.

In testimony whereof I hereunto sign my name.

GEORGE V. McCAULEY.